United States Patent [19]

Freudenschuss

[11] 3,823,258

[45] July 9, 1974

[54] COLOR FILM SCANNER WITH SINGLE PICK-UP TUBE

[75] Inventor: Otto Freudenschuss, Vienna, Austria

[73] Assignees: Karl Vockenhuber; Raimund Hauser, both of Vienna, Austria

[22] Filed: Oct. 18, 1972

[21] Appl. No.: 298,612

[30] Foreign Application Priority Data

Oct. 19, 1971 Austria .............................. 9047/71

[52] U.S. Cl. .......................... 178/5.2 D, 178/5.4 ST

[51] Int. Cl. ............................................ H04n 9/06

[58] Field of Search ...............178/5.2 D, 5 H, 5 ST, 178/DIG. 28, 5.4 E, 5.4 H

[56] References Cited

UNITED STATES PATENTS

| | | | |
|---|---|---|---|
| 3,641,255 | 2/1972 | Macovski ....................... | 178/5.4 ST |
| 3,696,202 | 10/1972 | Mori et al. ..................... | 178/5.4 ST |

*Primary Examiner*—Robert L. Richardson

[57] ABSTRACT

A method of picking up an image of an object onto a pick-up device, which image is movable relatively to the pick-up device, whereby the image is transformed into television signals and the signals are transmitted into different color channels. The method comprises in combination the steps of: decomposing the image optically into lines to obtain light beams of the image in line shape; the light beams project successively corresponding to the lines onto the pick-up device through a color decomposing device extending in the direction of the lines; the pick-up device is received in the direction of the lines and thereby sweeps in transverse direction to the direction of the lines with a sweeping amplitude corresponding to the height of the image line on the pick-up device, thereby generating the television signals in accordance with the image lines; the television signals are chopped and, the chopped signals are transmitted into the different color channels.

6 Claims, 6 Drawing Figures

COLOR FILM SCANNER WITH SINGLE PICK-UP TUBE

The invention relates to a method for television recording of coloured pictures of an object, for instance of films, moved relatively to a target.

It has already become known to use a colour decomposing pattern, for instance in the form of a lenticular screen or in the form of a colour strip filter. In that way a single pick-up tube may suffice. Generally the construction is so designed that the colour decomposing pattern is arranged in transverse direction to the horizontal scanning direction of the electron beam. During scanning the electron beam passes one after the other a number of fields assigned to different colours, whereby the output signal of the tube is modulated according to these colours. Of course it is also known for television receivers, to arrange the colour decomposing pattern in line direction, whereby the electron beam is swept over the gauge of the colour decomposing pattern. In all these cases it is necessary to provide a most fine-meshed colour decomposing pattern, in order to obtain a most high resolution. Naturally such fine-meshed patterns are difficult to produce.

By the invention these difficulties are overcome by the combination of the following features:

a. The image is optically decomposed into lines;

b. the line-shaped light beams are projected onto a target through a colour decomposing pattern designed in line direction;

c. the electroic scanning beam is swept during scanning the line;

d. the output signal is chopped corresponding to the colour decomposing pattern the beam has passed during sweeping and is switched over to particular colour channels.

If the storage time of the used pick-up tube allows it, only a single line may be used at scanning on the tube, which is due to the resolution of the picture in particular lines. Thus a device for the change of lines may be spared. Certainly it is known for instance from the U.S. Pat. No. 3,495,036 and the Austrian PS 139 355 to use a single scanning line. However by the combination of the extension of the colour decomposing pattern in line direction and the sweeping of the scanning beam there results the advantage that the colour decomposing pattern may be of any chosen breadth, whereby the sweeping amplitude corresponds to the breadth of the colour decomposing pattern. In that way all difficulties are avoided, which occured in the manufacture of such colour decomposing patterns.

An inventive arrangement for practicing this method is advantageous, showing a film gate illuminated by an illuminating means and a film drive, which may in case be continuous, whereby preferably a device for the optical balance of the continuous advance of the image, for instance a tilting mirror, is provided, further showing an optical system for the projection of the respective picture onto the target of the television camera tube, provided with a horizontal deflecting means, said picture being projected through a colour decomposing pattern, characterized in that in front of the television camera tube, preferably a multidiode camera tube, e.g. a telecon, there is assigned to each image line a colour decomposing pattern extending in the direction of the line, for instance a lenticular screen or a colour strip filter, as already known per se, that with the horizontal deflecting means there is connected an arrangement for sweeping the scanning beam, as it is likewise known, and that a multiplex transmitting device is connected in series to the output. A device for the optical balance of the continuous advance of the image is not absolutely necessary, as it is easily feasible to guide the film also along a slot optic. The use of multidiode camera tubes, as for instance a telecon, brings special advantages, as such sort of tubes normally show defects, which injure the picture. By the use of a few or only a single scanning line there can however easily be found a range on the tube target that shows no defects.

A usual film frequency for films amounts to 24 frames per sec. It is evident that the standard frequency of 50 frames per sec. cannot be attained at once, when letting pass such films before a television camera with the mentioned image frequency according to the inventive method. However in order to attain this frequency, it is provided in an advanced embodiment of the invention, to drive the device for the optical balance of the continuous advance of the image in a direction corresponding to the multiplication, preferably duplication of the image frequency, respectively with the corresponding velocity. That way the device for the optical balance runs opposite the film movement, so that in this case no optical balance of the continuous advance of the image is attained, but a multipliation thereof.

Further details of the invention will become apparent from the following specification of the embodiments schematically illustrated in the accompanying drawings.

Figure 1:
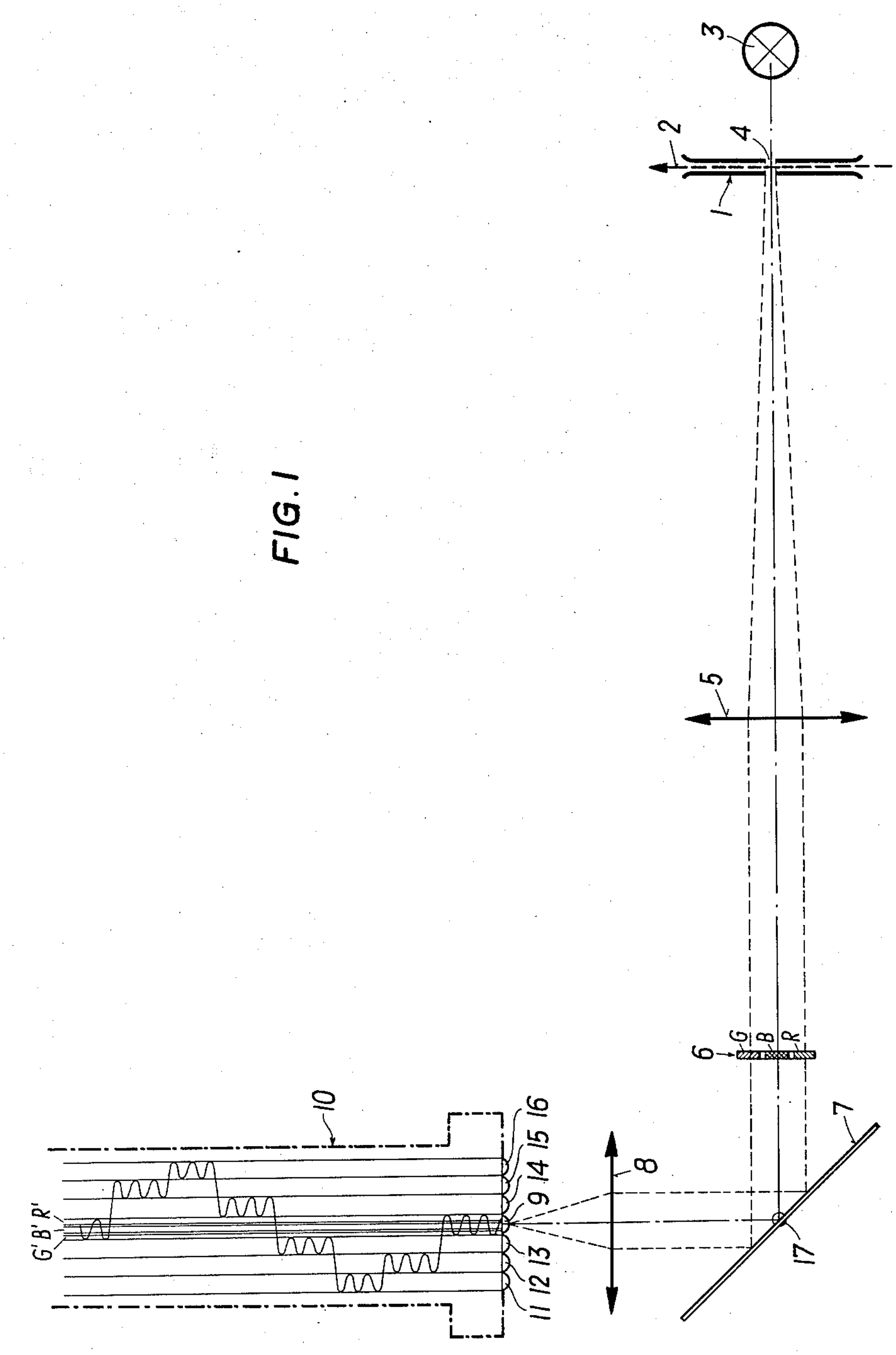
FIGS. 1 and 2 show two embodiments of the invention, whereas FIGS. 3A, 3B and 3C display kinematically the mode of action of a device for the optical balance in the embodiment according to claim 2.

According to FIG. 1 there is provided a projection lamp 3 behind a film gate 1 through which a film 2 is transported with continuous velocity. The film gate 1 shows only a narrow slot 4 extending over the total breadth of the images of the film 2. The light of the lamp 3 is thrown through this slot. The light beam emerging from the slot 4 passes a schematically indicated lens 5 through a strip filter 6, which consists in known manner of different coloured stripes G, B, R and intermediary transparent stripes. These stripes G, B, R may be relatively broad and run parallel to the slot 4. In that way the light beam emerging from the slot 4 is filtered according to the different colours of the colour filter 6, whereupon it is subsequently thrown onto a microlens 9 over a tilting mirror 7 and a collecting optical member 8. The microlens 9 is a cylinder lens, which extends in front of the target of a schematically indicated television pick-up tube 10 parallel to the slot 4. Correspondingly the line-shaped image arising behind the lens 9 is decomposed into colour stripes G′, B′, R′ as illustrated in FIG. 1 within the outlines of the pick-up tube 10, tilted by 90°.

The electron beam of the tube 10 is then swept over the total breadth of the image stripe arising behind the lens 9. In itself it would suffice to provide in front of the pick-up tube 10 a single cylinder lens 9 corresponding to the slot 4. Since however pick-up tubes show very often a considerable storage time, it is not possible to repeat immediately after scanning one line, the scanning of the same line. It is therefore expedient to provide in front of the target of the pickup tube 10 besides the cylinder lens 9 some further cylinder lenses, for instance lenses 11 to 16. In this case the line is changed after the scanning of one line, in that the tilting mirror is slightly deviated. For this purpose the line deflection and the mirror control are synchronized. The mirror 7 is for example fixed to an axis 17 of a galvanometer, the frame winding of which is connected with the vertical deflecting control of the tube 10.

In order to avoid a too quick and therefore hardly controllable tilting movement of the mirror, the control may for instance be carried out in that way that after the recording of a line in the range of the lens 9, the mirror 7 is deviated corresponding to a pace of two lenses, whereupon a line is recorded in the range of the lens 12. This is illustrated merely schmatically by the diagram drawn within the contours of the tube 10. After the recording of the line in the range of the lens 12, the electron beam may be guided to the range of the last illustrated lens 11, whereupon the following lines are scanned behind the lenses 13, 14 and 16. Then occurs the reversal and the mirror 7 is turned to the lens 15 and finally to the lens 9 and thereafter the cycle begins again.

However the synchronization of the mirror movement with the scanning beam may be dropped, if tubes with a particularly short storage time are used. This is for instance the case with multidiode camera tubes, e.g. the telecon. Here the special advantage occurs that, being difficult to manufacture just the telecon with a big target, it needs according to the inventive embodiment only to show the dimension of a single line.

Figure 2:
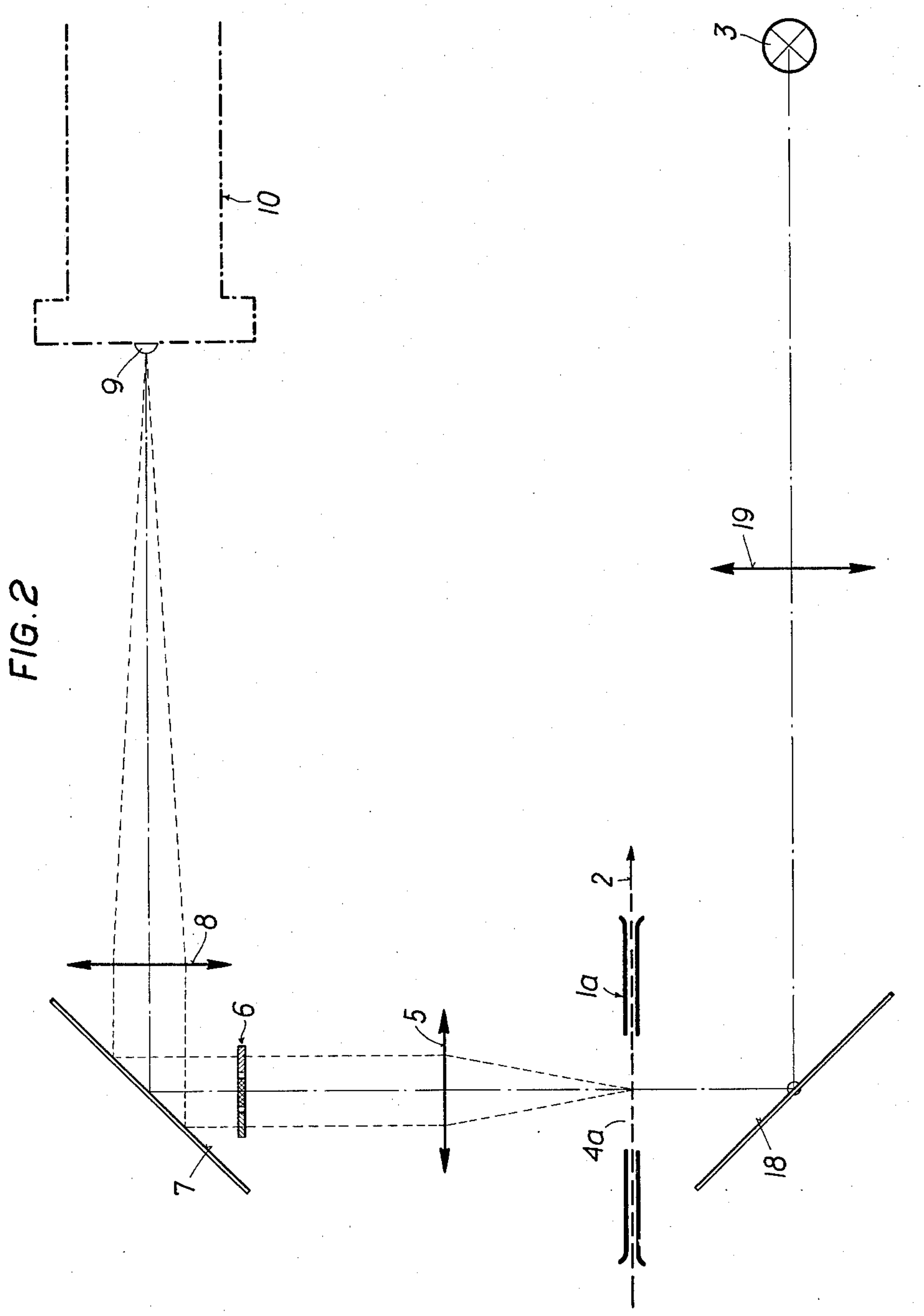

In the embodiment according to FIG. 2 the parts with the same function are marked with the same reference numerals as in FIG. 1. As it may be seen the mirror 7 is fixed, whereby only a single line on the target of the pick-up tube 10 behind the lens 9 is used for scanning.

A usual frame frequency for films is 24 frames per sec. On the other hand the standardized frame frequency for television amounts to 50 frames per sec. In order to attain a standardized frame frequency for television apparatus upon scanning conventional films, films 2 with a velocity of 25 frames per sec. may now be transported, whereby each image is scanned twice. For this purpose, according to FIG. 2, there is used a film gate 1*a*, customary in projectors with continuous film movement, provided with an image aperture 4*a* in the dimension of two images following on the film 2. Further there is provided a known device for the optical balance of the continuous advance of the image, in the illustrated embodiment it is a tilting mirror 18. The control of such tilting mirrors is known per se and not subject matter of the invention. The light of the projection lamp 3 is now collected by a cylinder lens 19 to a light strip, which — controlled by the tilting mirror 18 — hurries over the images of the film 2 and scans them.

Figure 3C:
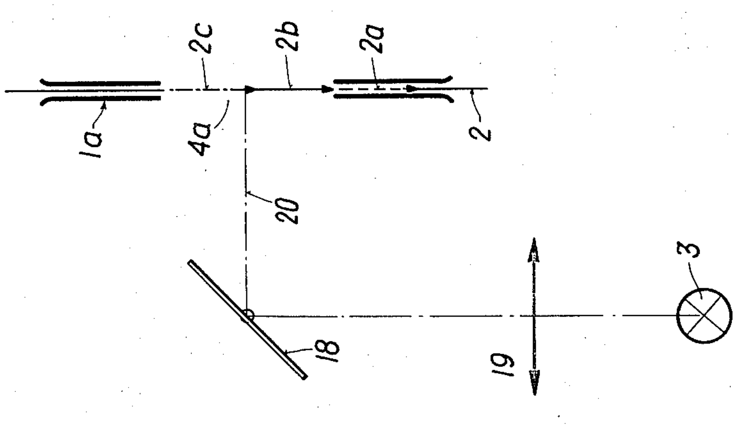

Contrary to the normal movement of a tilting mirror for the optical balance, which follows slowly the movement of the film and then returns quickly to its initial position, here for doubling the frame frequency, the tilting mirror 18 has to move slowly in opposite direction of the film movement, whereupon it quickly tilts back to its initial position. This is illustrated in the FIGS. 3A to 3C. The film 2 shows a succession of images, namely an image 2*a* in the dash-lined section, an image 2*b* in the section drawn in full lines and an image 2*c* in the dash-dotted section. Thereby the film moves in the direction of the arrows.

Figure 3B:
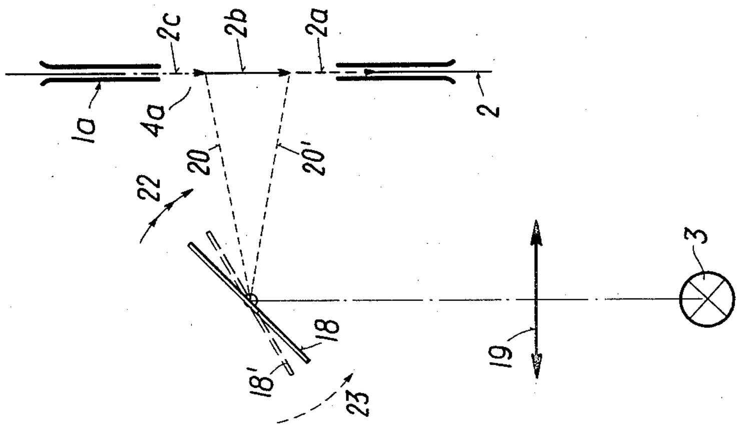
Figure 3A:
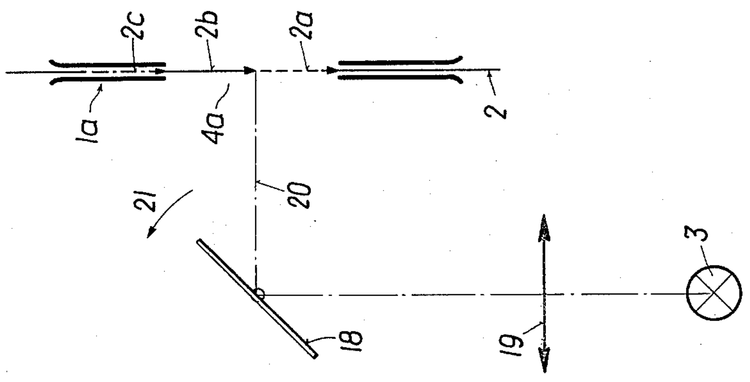

The line-shaped beam 20 of the lamp 3, collected by the cylinder lens 19, begins now to scan the image 2*b* in the very moment when this image is fully visible in the aperture 4*a* of the film gate 1*a* (see FIG. 3A). During scanning the mirror 18 moves slowly in the direction of the arrow 21.

Thus the line-shaped scanning beam 20 has reached the upper end of the image 2*b*, when the image 2*b* is just in the middle of the aperture 4*a* of the film gate 1*a* (see FIG. 3B). In this moment the mirror 18 tilts quickly back in the direction of the arrow 22 until the beam 20 has reached the position 20′, which corresponds to the position of the lower end of the image 2*b*. The mirror thereby takes its position 18′ illustrated in FIG. 3B in brocken lines. Outgoing from the position 18′ of the mirror and the position 20′ of the beam, the mirror 18 begins again to scan the image 2*b* a second time moving slowly in the direction of the arrow 23 with the same velocity as symbolized by the arrow 21 (see FIG. 3A).

The image 2*b* has then been scanned a second time, when the mirror 18 has reached a position corresponding to FIG. 3A. In this position (see FIG. 3C) the image 2*b* is just still fully visible within the aperture 4*a* of the film gate 1*a*, and the image 2*c* has just become visible in its entirety. Now the scanning cycle of the image 2*c* may begin again.

As may be seen from FIGS. 1 and 2, the filters 6 may practically have any optional size depending on their arrangement within the optical systems 5, 8, so that their manufacture is much simplified. On the other hand a scaled-down copy of the filter 6 is produced on the target of the pick-up tube 10, whereby the sweeping amplitude equals the breadth of this scaled-down copy. Of course it is possible within the scope of the invention to design the optical arrangement so that the filter 6 is arranged immediately in front of the pick-up tube 10. In this case the sweeping amplitude has to be increased correspondingly and it is necessary to enlarge the line-shaped beam, which is either a projection of the slot 4 or has been formed by the cylinder lens 19 (see FIG. 2).

Figure 4:
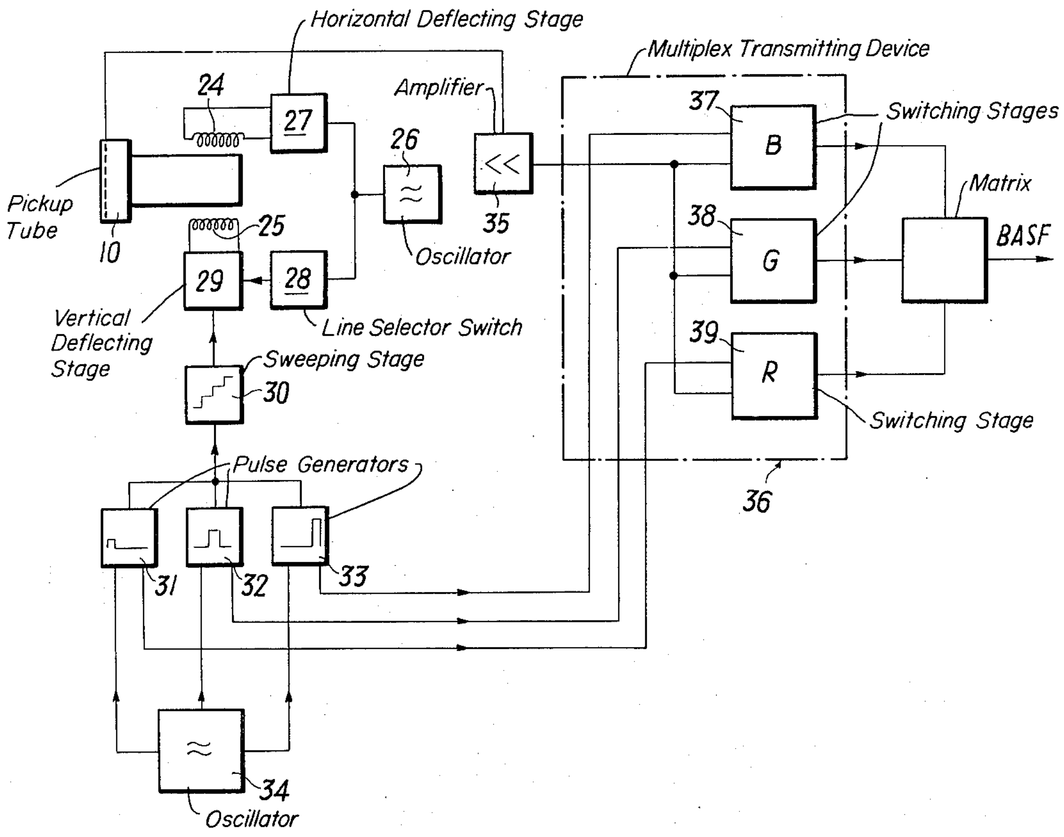
FIG. 4 illustrates a block diagram for an inventive embodiment.

In FIG. 4 the diagram of an inventive embodiment is illustrated, whereby the pick-up tube 10 shows a horizontal deflecting coil 24 and a vertical deflecting coil 25. The synchronization of horizontal and vertical deflection is attained by a common oscillator 26, which on the one hand controls a horizontal deflecting stage 27 and on the other hand a vertical deflecting stage 29 by means of a line selector switch 28. The line selector switch 28 and the vertical deflecting stage 29 are superfluous if, as shown in FIG. 2, a pick-up tube 10 with a single line is used.

However in order to sweep the scanning beam over the line to be scanned, the vertical deflecting coil 25 is connected with a sweeping stage 30, which receives its input signal over three pulse generators 31, 32, 33, which for synchronization are controlled by a common oscillator 34. In the embodiment the connection with the sweeping stage 30 is illustrated indirectly over the vertical deflecting stage 29.

During the scanning of the line projected on the target of the pick-up tube 10, successive signals for instance the blue, yellow and red signal are received as a consequence of sweeping; said signals are amplified in an amplifier 35, are chopped corresponding to the colour decomposing pattern, the beam passes upon sweeping, and are switched over to particular colour channels. According to FIG. 4 a multiplex transmitting device 36 is provided therefor, the particular switching stages 37, 38, 39 of which are synchronously controlled by the pulse generators 31, 32, 33 controlling the sweeping stage 30. In that way the output signal of the pick-up tube 10 is switched over to particular colour channels, whereby the outputs of the three switching stages 37, 38, 39 are fed to a matrix, which forms the FBAS signal.

What is claimed is:

1. A method for picking up an image of an object onto a pick-up means, said image being movable relative to said pick-up means, whereby said image is transformed into television signals and said signals are transmitted into different colour channels; the method comprising in combination the steps of:

scanning said image optically into lines to obtain light beams of said image in line shape;

successively projecting said light beams corresponding to said image lines onto said pick-up means through colour decomposing means for decomposing each of said image lines into a predetermined number of colour lines, each colour line forming a chromatic selection of the related image line;

scanning said pick-up means in the direction of said colour lines and thereby sweeping in transverse direction to the direction of the colour lines with a sweeping amplitude corresponding to the height of the colour lines corresponding to one image line on said pick-up means, thereby generating said television signals in accordance with the colour lines;

chopping said television signals;

transmitting said chopped signals into said different colour channels.

2. In an arrangement for picking up at least one image of an object onto a pick-up means, said image being movable relative to said pick-up means, said pick-up means including means for transforming said image into television signals and scanning means; the arrangement comprising in combination:

means for emitting light beams in line shape, said means including a light source;

gate means for holding said image relative to said pick-up means;

an optical system defining an optical path for guiding said light beams;

colour decomposing means located between said gate means and said pick-up means within said optical path for projecting a plurality of chromatic selection lines corresponding to one line of said image onto said pick-up means;

sweeping means electrically connected with said scanning means to sweep in transverse direction to the direction of said chromatic selection lines during scanning in said line direction, the sweeping amplitude corresponding at least to the height of the chromatic selection lines derived from one line of said image;

chopping means for chopping said television signals;

multiplex transmitting means for receiving the chopped television signals.

3. An arrangement as claimed in claim 2, wherein said pick-up means have a multidiode target.

4. An arrangement as claimed in claim 3, wherein said target consists of a matrix of silicium diodes.

5. An arrangement as claimed in claim 2, further comprising drive means for continuously driving a film and means for repeatedly scanning each image of said film.

6. An arrangement as claimed in claim 5, wherein said means for repeated scanning comprise optical means to compensate the image movement, means to drive said optical means in a direction opposite to the direction of the film movement.

* * * * *